United States Patent [19]

Wissbrun et al.

[11] Patent Number: 4,540,737

[45] Date of Patent: Sep. 10, 1985

[54] METHOD FOR THE FORMATION OF COMPOSITE ARTICLES COMPRISED OF THERMOTROPIC LIQUID CRYSTALLINE POLYMERS AND ARTICLES PRODUCED THEREBY

[75] Inventors: Kurt F. Wissbrun, Short Hills; Richard D. Orwoll, Mountainside, both of N.J.

[73] Assignee: Celanese Corporation, New York, N.Y.

[21] Appl. No.: 464,303

[22] Filed: Feb. 7, 1983

[51] Int. Cl.³ .................. B32B 27/06; C08G 63/60; B29B 3/10
[52] U.S. Cl. .................. 524/599; 264/174; 524/606; 528/190; 528/191; 528/192; 528/193; 528/128; 528/176
[58] Field of Search .................. 528/190–193, 528/123, 126, 176, 128; 264/174; 428/480, 383; 156/180; 524/599, 606

[56] References Cited

U.S. PATENT DOCUMENTS

| | | | |
|---|---|---|---|
| 3,608,033 | 9/1971 | Hall | 264/174 |
| 3,829,545 | 8/1974 | Vlaenderen | 264/174 |
| 4,182,382 | 1/1980 | Ingraham | 264/174 |
| 4,196,464 | 4/1980 | Russell | 264/176 F |
| 4,267,289 | 5/1981 | Froix | 264/176 F |
| 4,330,587 | 5/1982 | Woodbrey | 428/480 |
| 4,349,659 | 9/1982 | Kato et al. | 528/190 |
| 4,355,133 | 10/1982 | Eeast et al. | 528/190 |
| 4,394,417 | 7/1983 | Hilker | 428/480 |
| 4,410,683 | 10/1983 | Gale | 528/190 |
| 4,418,122 | 11/1983 | Rieder et al. | 528/176 |

Primary Examiner—James Lowe
Attorney, Agent, or Firm—Burns, Doane, Swecker & Mathis

[57] ABSTRACT

A method for the production of composite articles by pultrusion is provided wherein the articles comprise thermotropic liquid crystalline polymers and reinforcing fibers. The liquid crystalline polymers employed exhibit physical characteristics such that the negative slope of a dynamic viscosity-frequency curve (as defined) is less than about 0.35. The use of polymers having such rheological characteristics enables a composite material to be produced by pultrusion in which the polymer is uniformly dispersed among the reinforcing fibers.

16 Claims, 2 Drawing Figures

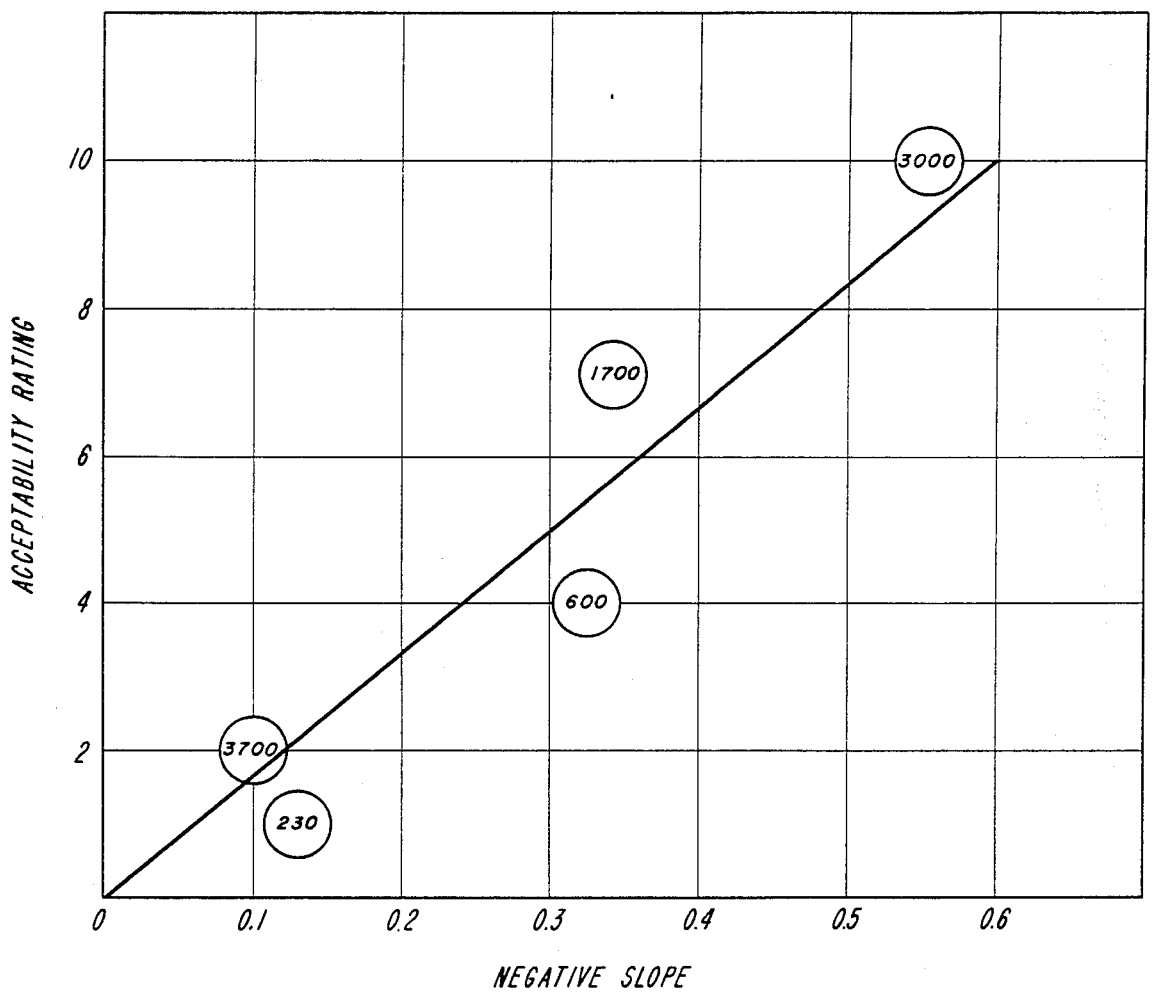

METHOD FOR THE FORMATION OF COMPOSITE ARTICLES COMPRISED OF THERMOTROPIC LIQUID CRYSTALLINE POLYMERS AND ARTICLES PRODUCED THEREBY

BACKGROUND OF THE INVENTION

The present invention is directed to an improved method for the production of composite articles by pultrusion.

It has long been known to produce composite reinforced articles such as prepreg tapes and rovings by various pultrusion methods. See, for example, U.S. Pat. Nos. 3,042,570; 3,608,033; 3,684,622; 3,742,107; 3,793,108; 3,960,629; 3,993,726; 4,132,756; and 4,312,917. While such methods are generally capable of producing acceptable products, it is desirable in certain instances to employ a matrix material which enhances the ability of the product to be employed in certain environments where thermal and chemical stability are important. High degrees of orientation of the polymer matrix are also sometimes desirable to optimize the mechanical properties of the product.

It is further necessary that articles produced by pultrusion satisfy the following basic requirements during processing: (1) that the reinforcing fibers be uniformly distributed throughout the polymer matrix material; (2) that the bundles of the reinforcing fibers which are employed should be well impregnated with the matrix polymer; and (3) that the fibers should be sufficiently bonded to the matrix polymer.

OBJECTS AND SUMMARY OF THE INVENTION

It is therefore an object of the present invention to provide a method for the continuous production of a composite article by pultrusion whereby a thermotropic liquid crystalline matrix polymer is uniformly distributed among the reinforcing fibers.

It is also an object of the present invention to provide a method for the production of a composite article by pultrusion whereby a thermotropic liquid crystalline matrix polymer is sufficiently bonded to the reinforcing fibers.

It is also an object of the present invention to provide a composite article produced by pultrusion which comprises a thermotropic liquid crystalline matrix polymer and exhibits desirable mechanical properties, and chemical and thermal stability.

In accordance with the present invention, there is thus provided a method for the production of a composite reinforced article by pultrusion whereby said article is formed by causing at least one continuous length bundle of reinforcing fibers to advance into a crosshead extruder die, forcing a molten thermoplastic matrix polymer into said die under pressure to impregnate said at least one fiber bundle, and continuously extruding and pulling said at least one impregnated bundle through at least one exit orifice of said die to shape said at least one impregnated fiber bundle into said composite reinforced article, the improvement wherein said polymer comprises a thermotropic liquid crystalline polymer which possesses rheological properties such that a dynamic viscosity-frequency curve based on such characteristics has a negative slope of less than about 0.35 when measured at a frequency of 1 sec$^{-1}$.

In accordance with the present invention there is also provided a composite article produced by the above method.

BRIEF DESCRIPTION OF THE DRAWINGS

FIG. 2 is a graphical depiction of the correlation between the slope of the dynamic viscosity-frequency curve for various polymers and the acceptability rating accorded the product comprised of such polymers.

DETAILED DESCRIPTION OF THE INVENTION

Figure 1:
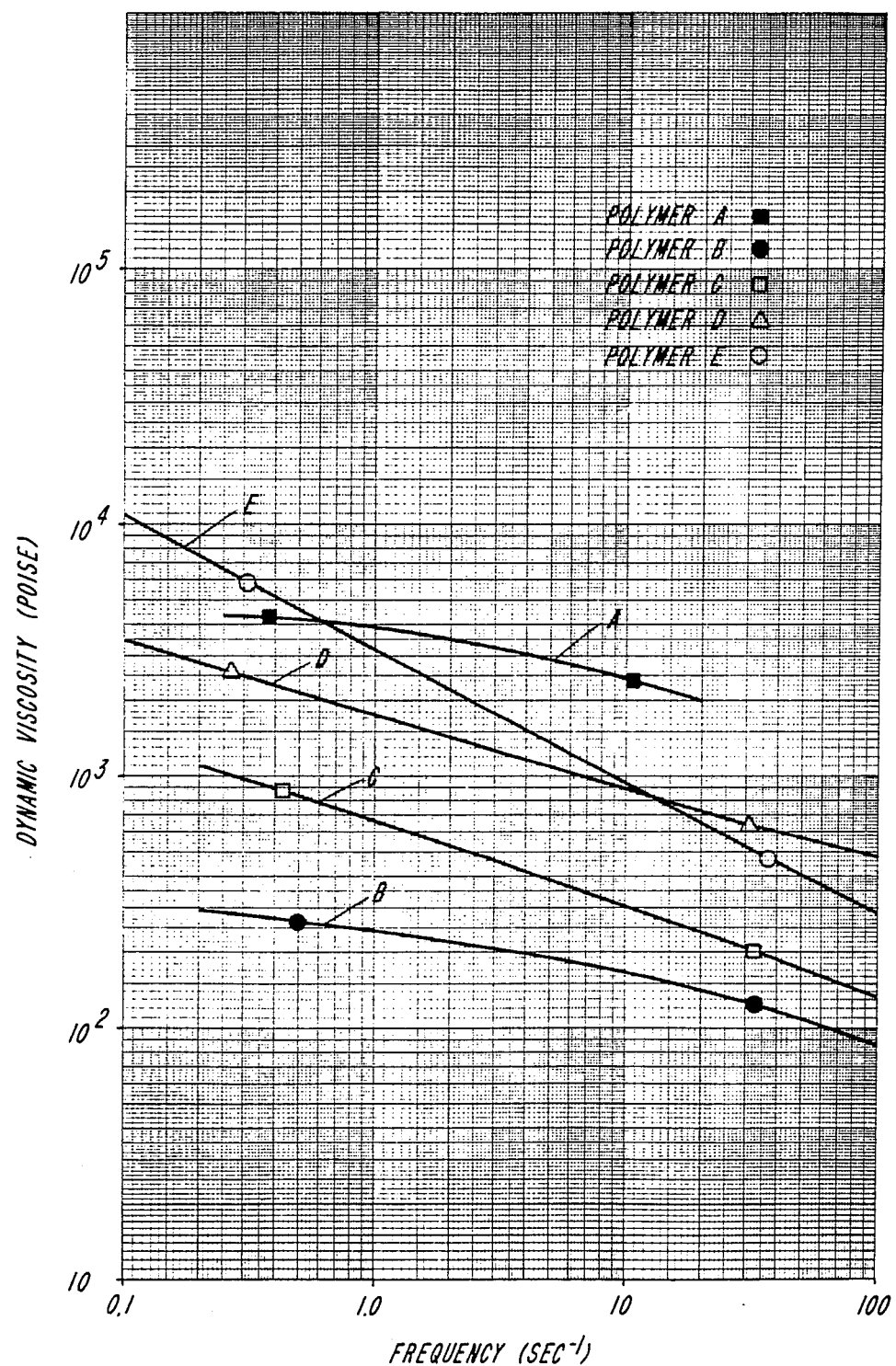
FIG. 1 is a graphical depiction of the dynamic viscosity-frequency curves for various thermotropic liquid crystalline polymers.

It has been surprisingly and unexpectedly discovered that thermotropic liquid crystalline polymers (as defined) are particularly suitable for use in the production of a composite article by pultrusion wherein the article comprises a fiber-reinforced matrix of the polymer.

Thermotropic liquid crystal polymers are polymers which are liquid crystalline (i.e., anisotropic) in the melt phase. These polymers have been described by various terms, including "liquid crystalline," "liquid crystal", "mesophase" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such properties may be confirmed by conventional polarized light techniques whereby crossed polarizers are utilized. More specifically, the anisotropic melt phase may be confirmed by the use of a Leitz polarizing microscope at a magnification of 40× with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Thermotropic liquid crystal polymers include but are not limited to wholly and non-wholly aromatic polyesters, aromatic-aliphatic polyesters, aromatic polyazomethines, aromatic polyester-carbonates and aromatic and non-wholly aromatic polyester-amides.

The aromatic polyesters and polyester-amides are considered to be "wholly" aromatic in the sense that each moiety present in the polyester contributes at least one aromatic ring to the polymer backbone and which enable the polymer to exhibit anisotropic properties in the melt phase. Such moieties may be derived from aromatic diols, aromatic amines, aromatic diacids and aromatic hydroxy acids. Moieties which may be present in the thermotropic liquid crystal polymers employed in the present invention (wholly or non-wholly aromatic) include but are not limited to the following:

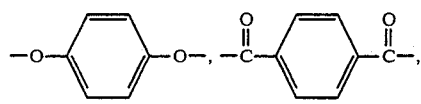

-continued

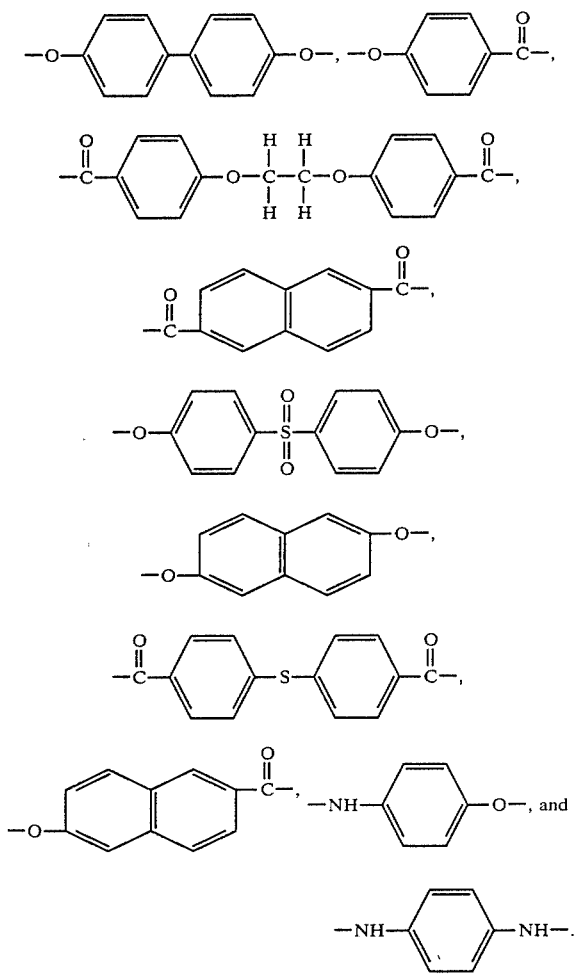

Preferably, the thermotropic liquid crystal polymers which are employed comprise not less than about 10 mole percent of recurring units which include a naphthalene moiety. Preferred naphthalene moieties include 6-oxy-2-naphthoyl, 2,6-dioxynaphthalene and 2,6-dicarboxynaphthalene.

Specific examples of aromatic-aliphatic polyesters are copolymers of polyethylene terephthalate and hydroxybenzoic acid as disclosed in *Polyester X7G-A Self Reinforced Thermoplastic,* by W. J. Jackson, Jr. H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I. Preparation and Properties of p-Hydroxybenzoic Acid Copolymers," *Journal of Polymer Science, Polymer Chemistry Edition,* Vol. 14, pp. 2043-58 (1976), by W. J. Jackson. Jr., and H. F. Kuhfuss. The above-cited references are herein incorporated by reference in their entirety.

Aromatic polyazomethines and processes of preparing the same are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrolo-2-methyl-1,4-phenylenenitrolomethylidyne-1,4-phenylene-methylidyne); and poly(nitrolo-2-chloro-1,4-phenylenenitrilomethyldyne-1,4-phenylene-methylidyne).

Aromatic polyester-carbonates are disclosed in U.S. Pat. Nos. 4,107,143 and 4,284,757, and U.S. patent application Ser. No. 319,024, filed Nov. 6, 1981 (now U.S. Pat. No. 4,371,660), which are herein incorporated by reference in their entirety. Examples of such polymers include those consisting essentially of p-oxybenzoyl units, p-dioxyphenyl units, dioxycarbonyl units, and terephthoyl units.

Aromatic polyester-amides and processes of preparing the same are disclosed in U.S. Pat. No. 4,182,842. Further disclosure of such copolymers can be found in "Liquid Crystal Polymers: III Preparation of Properties of Poly(Ester Amides) from p-Aminobenzoic Acid and Poly(Ethylene Terephthalate)," *Journal of Applied Polymer Science,* Vol. 25, pp. 1685-1694 (1980), by W. J. Jackson, Jr., and H. F. Kuhfuss. The above-cited references are herein incorporated by reference in their entirety.

The liquid crystal polymers which are preferred for use in the present invention are the thermotropic wholly aromatic polyesters. Recent publications disclosing such polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,146,702; 4,153,779; 4,156,070; 4,159,365; 4,169,933; 4,181,792; 4,188,476; 4,201,856; 4,226,970; 4,232,143; 4,232,144; 4,238,600; and 4,245,082; and (f) U.K. Application No. 2,002,404.

Wholly aromatic polyesters and polyester-amides are also disclosed in commonly-assigned U.S. Pat. Nos. 4,067,852; 4,083,829; 4,130,545; 4,161,470; 4,184,996; 4,219,461; 4,230,817; 4,238,598; 4,238,599; 4,244,433; 4,256,624; 4,279,803; 4,299,756; 4,330,457; 4,337,191; 4,339,375; 4,341,688; 4,351,917; 4,351,918; and 4,355,132. The disclosure of all of the above identified commonly-assigned U.S. patents are herein incorporated by reference in their entirety. The wholly aromatic polyesters and polyester-amides disclosed therein typically are capable of forming an anisotropic melt phase at a temperature below approximately 400° C., and preferably below approximately 350° C.

The thermotropic liquid crystal polymers including wholly aromatic polyesters and polyester-amides which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final stage of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety. Although that patent is directed to the preparation of wholly aromatic polyesters, the process may also be employed to form polyester-amides.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided. When polyester-amides are to be formed, an amine group may be provided as lower acyl amide.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters and polyester-amides suitable for use in the present invention tend to be substantially insoluble in common polyester solvents and accordingly are not susceptible to solution processing. As discussed previously, they can be readily processed by common melt processing techniques. Most suitable wholly aromatic polymers are soluble in pentafluorophenol to a limited extent.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic polyester-amides which are preferred for use in the present invention commonly exhibit a molecular weight of about 5,000 to 50,000, and preferably about 10,000 to 30,000; e.g., 15,000 to 17,000. Such molecular weight may be determined by gel permeation chromatography and other standard techniques not involving the solutioning of the polymer; e.g., by end group determination via infrared spectroscopy on compression molded films. Alternatively, light scattering techniques in pentafluorophenol solution may be employed to determine the molecular weight.

The wholly aromatic polyesters and polyester-amides additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine and bromine. Although bromine atoms tend to be released from organic compounds at high temperatures, bromine is more stable on aromatic rings than on aliphatic chains, and therefore is suitable for inclusion as a possible substituent on the aromatic rings.

The thermotropic liquid crystalline polymers which are suitable for use in the present invention possess rheological characteristics such that the negative slope of a dynamic viscosity-frequency curve based on such characteristics for the specific polymer is less than about 0.35 and preferably less than about 0.15 at a frequency of 1 sec$^{-1}$. It should be noted that the actual values of the slopes of the viscosity-frequency curves depicted in FIG. 1 are less than zero due to the orientation of the curves. In order to obtain a positive value, the slope is denoted as a negative slope.

The dynamic viscosity-frequency curve is determined by use of a mechanical oscillatory spectrometer by standard procedures. Once the data points for the viscosity-frequency relationship have been determined, the curve may be plotted. The slope may then be determined by drawing a tangent to the curve at a frequency of one reciprocal second (1 sec$^{-1}$) and measuring the slope of the tangent. The theory, design and use of such an instrument is fully described in the literature and will not be discussed in detail herein. See, for example, J. M. Dealy, "Rheometrics for Molten Plastics", van Nostrand Reinhold, N.Y., 1982; R. W. Whorlow, "Rheological Techniques", Wiley, N.Y., 1980; and K. Walters, "Rheometry", Wiley, N.Y., 1975.

The use of a polymer having such characteristics enables a composite article to be produced wherein the polymer is uniformly dispersed among the reinforcing fibers. By way of contrast, the polymer will otherwise tend to disperse in a non-uniform manner such that the reinforcing fibers are no longer evenly disposed and substantially parallel. Such non-uniformity has an adverse effect upon the ultimate physical characteristics of the composite article.

A specific advantage of the method of the present invention resides in the fact that a composite article can be produced by pultrusion which exhibits satisfactory properties even with a polymer which possesses a high viscosity. A surprising and unexpected advantage of the invention is the fact that a satisfactory composite article can be produced irrespective of the viscosity of the polymer if the polymer otherwise satisfies the dynamic viscosity-frequency requirements. It is, however, preferable for the viscosity of the polymer to be as low as possible since, given the same viscosity-frequency characteristics, a polymer having the lower viscosity will generally produce a composite article having a higher rating (i.e., the polymer is more uniformly distributed) than a polymer of higher viscosity. The polymer viscosity (I.V.) is preferably in the range of about 2.5 to 4.5 dl./g.

In support of the above, FIG. 1 depicts the viscosity-frequency curves for the five thermotropic liquid crystalline polymers identified in Table 1 below with the viscosity of each being measured by small amplitude oscillatory rheometry on the Rheometrics Mechanical Spectrometer at a temperature approximately 20° C. above the melting temperature of the polymers. Specifically, the viscosity of polymers A and C was measured at 300° C., the viscosity of polymer B was measured at 230° C. and the viscosity of polymers D and E was measured at 310° C.

TABLE 1

Rheological Characteristics of Exemplary Liquid Crystalline Polymers

| Polymer | Viscosity at 1 sec$^{-1}$ (poise) | Negative Slope at 1 sec$^{-1}$ |
|---|---|---|
| A | 3700 | 0.10 |
| B | 230 | 0.13 |
| C | 600 | 0.32 |
| D | 1700 | 0.34 |
| E | 3000 | 0.55 |

Polymer A is identified in Example 1.
Polymer B is identified in Example 2.
Polymer C is identified in Example 3.
Polymer D is identified in Example 4.
Polymer E is identified in the Comparative Example.

Composite articles produced by pultrusion and comprised of the above matrix polymers were also examined to determine their acceptability ratings indicative of the uniformity of fiber impregnation and fiber dispersal. Such ratings (from 1 to 10 with a 1 rating being the most desirable) were correlated versus the slope of the viscosity-frequency curve of the polymer employed and are depicted in FIG. 2. FIG. 2 confirms that the acceptability of the ultimate product is generally independent of the viscosity of the polymer. The exception to such a condition is that, given the same slope for the viscosity-frequency curve, the polymer having the lower viscosity will generally provide the more acceptable product. Such advantages are further verified in Examples 1 to 4.

Especially preferred wholly aromatic polyesters and polyester-amides which possess the necessary rheological characteristics are those which are disclosed in above-noted U.S. Pat. Nos. 4,219,461, 4,256,624 and 4,330,457.

The polyester disclosed in U.S. Pat. No. 4,219,461 is a melt processable wholly aromatic polyester which is capable of forming an anisotropic melt phase at a temperature below approximately 320° C. The polyester consists essentially of the recurring moieties I, II, III and IV wherein:

I is

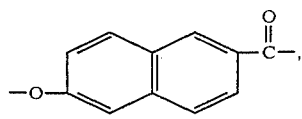

II is

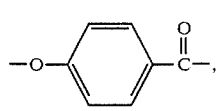

III is a dioxy aryl moiety of the formula ⁺O—Ar—O⁺ wherein Ar is a divalent radical comprising at least one aromatic ring, and IV is a dicarboxy aryl moiety of the formula

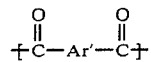

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties III and IV are set forth in above-noted U.S. Pat. No. 4,219,461. The preferred dioxy aryl moiety III is:

and the preferred dicarboxy aryl moiety IV is:

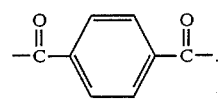

The polyester disclosed in U.S. Pat. No. 4,256,624 is a melt processable wholly aromatic polyester which is capable of forming an anisotropic melt phase at a temperature below approximately 400° C. The polyester consists essentially of the recurring moieties I, II, and III wherein:

I is

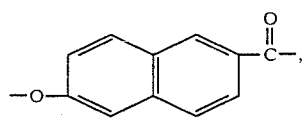

II is a dioxy aryl moiety of the formula ⁺O—Ar—O⁺ where Ar is a divalent radical comprising at least one aromatic ring, and III is a dicarboxy aryl moiety of the formula

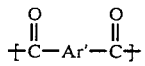

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties II and III of the polyester described immediately above are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties II and III are set forth in above-noted U.S. Pat. No. 4,256,624. The preferred dioxy aryl moiety II is:

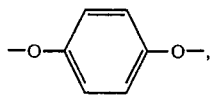

and the preferred dicarboxy aryl moiety III is:

U.S. Pat. No 4,330,457 discloses a melt processable polyester-amide which is capable of forming an anisotropic melt phase at a temperature below approximately 400° C. The polyesteramide consists essentially of the recurring moieties I, II, III and optionally IV wherein: I is

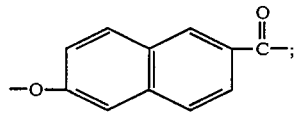

II is

where A is a divalent radical comprising at least one aromatic ring or a divalent trans-cyclohexane radical;

III is $-\!\!\!+\!\!Y\!\!-\!\!Ar\!\!-\!\!Z\!\!+\!\!-$ where Ar is a divalent radical comprising at least one aromatic ring, Y is O, NH, or NR, and Z is NH or NR, where R is an alkyl group of 1 to 6 carbon atoms or an aryl group; and IV is $-\!\!\!+\!\!O\!\!-\!\!Ar'\!\!-\!\!O\!\!+\!\!-$ where Ar' is a divalent radical comprising at least one aromatic ring;

and wherein said polyester-amide comprises approximately 10 to 90 mole percent of moiety I, approximately 5 to 45 mole percent of moiety II, approximately 5 to 45 mole percent of moiety III and approximately 0 to 40 mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Preferred moieties, II, III and IV are set forth in above-noted U.S. Pat. No. 4,330,457. The preferred dicarboxy aryl moiety II is:

the preferred moiety III is:

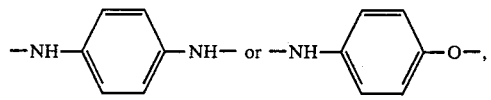

and the preferred dioxy aryl moiety IV is:

The articles of the present invention may be produced by conventional pultrusion processes. The pultrusion molding apparatus used in conjunction with the method of the present invention is not critical to practice of the invention and may be any conventional pultrusion apparatus. Pultrusion processes are well-known in the art as evidenced by U.S. Pat. Nos. 3,793,108; 3,960,629; and 3,993,726, each herein incorporated by reference, with the articles being produced basically by extrusion of the matrix polymer as the reinforcing fiber passes through the die. More specifically, the composite article is formed by causing at least one continuous length bundle or yarn of reinforcing fibers to advance into a crosshead extruder die, forcing a molten thermoplastic matrix polymer into the die under pressure to impregnate the at least one fiber bundle or yarn and continuously extruding and pulling the at least one impregnated bundle or yarn through at least one exit orifice of the die to shape the at least one impregnated fiber bundle or yarn into the desired composite reinforced article.

Articles produced by the method of the present invention include approximately 1 to 65 and preferably approximately 50 to 60 percent by volume of a reinforcing agent. Representative fibers which may serve as reinforcing agents include but are not limited to glass fibers, graphitic carbon fibers, amorphous carbon fibers, synthetic polymeric fibers, aluminum fibers, titanium fibers, steel fibers, tungsten fibers, ceramic fibers, etc. Such reinforcing fibers are generally present in the form of long, substantially straight, parallel strands and normally present as fiber bundles for enhanced reinforcing ability. Carbon fibers are the preferred reinforcing fiber for use in the present invention. In the resulting article, the fiber bundles are desirably spread into a single continuous bundle for optimum reinforcement.

Representative filler materials may also be employed in amounts ranging from about 1 to 50 percent by weight. Exemplary filler materials include calcium silicate, silica, clays, talc, mica, polytetrafluoroethylene, graphite, alumina trihydrate, sodium aluminum carbonate, barium ferrite, etc.

In order to form the article of the present invention by pultrusion, the polymer or molding compound is brought to the melt temperature of the polymer, e.g., approximately 270 to 300° C., and is then extruded into a die cavity. The die cavity is commonly maintained at a temperature of approximately 310° C. The polymer in its melt phase is injected into the die cavity at a pressure of approximately 5 to 50 psi while the reinforcing fiber is caused to pass through the extrusion zone at a speed ranging from about several inches/minute to about 20 feet/minute.

The composite articles produced according to the method of the present invention may take many forms depending upon the type of extrusion die employed and the manner by which the reinforcing fibers are passed through the zone. Typically, the composite article will be in the form of a tape which is substantially planar in dimension. The tape subsequent to formation can be employed in the production of other articles whereby the tape is laminated upon other tapes similarly produced by means of temperature and pressure. A reinforced laminate can thus be obtained which exhibits desirable mechanical properties.

The invention is additionally illustrated in connection with the following Examples which are to be considered as illustrative of the present invention. It should be understood, however, that the invention is not limited to the specific details of the Examples.

EXAMPLE 1

A reinforced tape was produced by pultrusion with a crosshead extrusion die with the matrix polymer comprising a thermotropic liquid crystalline polymer prepared from 40 mole percent of 6-acetoxy-2-naphthoic acid, 40 mole percent of p-acetoxybenzoic acid, 10 mole percent of hydroquinone diacetate, and 10 mole percent of terephthalic acid (I.V. of 4.3) and reinforcing carbon fibers marketed by Celanese Corporation under the designation Celion 6000. The value of the negative slope of the dynamic viscosity-frequency curve for the matrix resin was determined to be 0.10 at 1 sec$^{-1}$ (see FIG. 1, Polymer A).

The crosshead die employed was approximately 6 inches wide and 9 inches long, having entrance and exit slits approximately 3 inches wide. The maximum thickness of the interior of the die was approximately 0.5 inch.

The carbon fiber was in the form of a yarn of carbonaceous filamentary material derived from an acrylonitrile copolymer consisting of approximately 98 mole percent of acrylonitrile units and 2 mole percent of methylacrylate units. The carbonaceous material consisted of about 6000 substantially parallel filaments, containing about 93 percent carbon by weight. Approximately 30 carbon fiber yarns were caused to pass through the die along a horizontal plane. Representative average filament properties for the carbon fiber include a denier of 0.6, a tensile strength of approximately 470,000 psi, a Young's modulus of approximately 34 million psi, and an elongation of approximately 1.4 percent. A die temperature of 250° C. and extrusion pressure of 5 psi together with a fiber speed of 5 feet/minute were employed. The tape thus produced had a width of approximately 3 inches and was approximately 0.012 inch in thickness.

The tape was examined under a microscope and determined to consist of reinforcing fibers uniformly dispersed within the matrix resin and well impregnated with the resin. The resin desirably dispersed the individual fibers within the yarns across the width of the tape such that uniform fibrous reinforcement was obtained. The tape was accorded a rating of 2 as being indicative of being nearly totally acceptable.

COMPARATIVE EXAMPLE A

The procedure of Example 1 was repeated under similar conditions with the die temperature and pressure being adjusted to the melting temperature of the polymer employed with the thermotropic liquid crystalline matrix polymer being comprised of 73 mole percent of p-oxybenzoyl moieties and 27 mole percent of 6-oxy-2-naphthoyl moieties (I.V. of 5.2). The value of the negative slope of the dynamic viscosity-frequency curve for the matrix resin was determined to be 0.55 at 1 sec$^{-1}$ (see FIG. 1, Polymer E). The tape produced by the pultrusion process was examined and determined to be unsatisfactory in that the fibers were not sufficiently uniformly dispersed within the matrix resin and the matrix resin did not uniformly impregnate the fibers, resulting in the formation of non-uniform alternating bands of resin and carbon fibers. The tape was thus accorded a rating of 10 as being indicative of total unsuitability.

EXAMPLE 2

The procedure of Example 1 was repeated under similar conditions with the die temperature and pressure being adjusted to the melting temperature of the polymer employed with the thermotropic liquid crystalline matrix polymer being prepared from 60 mole percent of 6-hydroxy-2-naphthoic acid, 20 mole percent of terephthalic acid and 20 mole percent of hydroquinone diacetate (I.V. of 4.2). The value of the negative slope of the dynamic viscosity-frequency curve for the matrix resin was determined to be 0.13 at 1 sec$^{-1}$ (see FIG. 1, Polymer B). As was the case with Example 1, the tape produced was determined to be totally acceptable and accorded a rating of 1.

EXAMPLE 3

The procedure of Example 2 was repeated under similar conditions with a matrix polymer of identical composition with the exception that the polymer exhibited an I.V. of 4.8 and the value of the negative slope of the dynamic viscosity-frequency curve for the matrix resin was determined to be 0.32 at 1 sec$^{-1}$ (see FIG. 1, Polymer C). The tape produced was accorded a rating of 4.

EXAMPLE 4

The procedure of Example 1 was repeated under similar conditions with the die temperature and pressure being adjusted to the melting temperature of the polymer employed with the thermotropic liquid crystalline matrix polymer being prepared from 60 mole percent of 6-hydroxy-2-naphthoic acid, 20 mole percent of terephthalic acid and 20 mole percent of p-acetoxyacetanilide (I.V. of 3.9). The value of the negative slope of the dynamic viscosity-frequency curve for the matrix resin was determined to be 0.34 at 1 $\sec^{-1}$ (see FIG. 1, Polymer D). The tape produced was determined to be acceptable although less so than the tapes of Examples 1 and 2 and accorded a rating of 7.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. In a method for the production of a composite reinforced article by pultrusion whereby said article is formed by causing at least one continuous length bundle of reinforcing fibers to advance into a crosshead extruder die, forcing a molten thermoplastic matrix polymer into said die under pressure to impregnate said at least one fiber bundle, and continuously extruding and pulling said at least one impregnated bundle through at least one exit orifice of said die to shape said at least one impregnated fiber bundle into said composite reinforced article, the improvement wherein said polymer comprises a thermotropic liquid crystalline polymer which possesses rheological properties such that a dynamic viscosity-frequency curve based on such characteristics has a negative slope of less than about 0.35 when measured at a frequency of 1 $\sec^{-1}$.

2. The method of claim 1 wherein said polymer is a wholly aromatic polymer.

3. The method of claim 2 wherein said polymer is a wholly aromatic polyester.

4. The method of claim 1 wherein said polymer comprises at least about 10 mole percent of recurring units which include a naphthalene moiety.

5. The method of claim 1 wherein said polymer comprises a melt processable wholly aromatic polyester which is capable of forming an anisotropic melt phase and consists essentially of the recurring moieties I, II, and III wherein:

I is

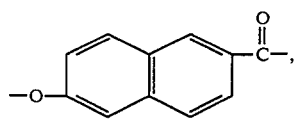

II is a dioxy aryl moiety of the formula $-\!\!\{\!O\!-\!Ar\!-\!O\!\}\!-$ where Ar is a divalent radical comprising at least one aromatic ring, and III is a dicarboxy aryl moiety of the formula

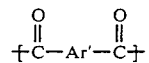

where Ar' is a divalent radical comprising at least one aromatic ring, and wherein said polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

6. The method of claim 5 wherein said polyester comprises approximately 20 to 80 mole percent of moiety I, approximately 10 to 40 mole percent of moiety II, and approximately 10 to 40 mole percent of moiety III.

7. The method of claim 1 wherein said polymer comprises a melt processable wholly aromatic polyester which is capable of forming an anisotropic melt phase and consists essentially of the recurring moieties I, II, III and IV wherein:

I is

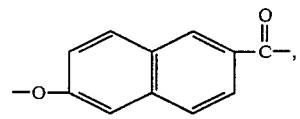

II is

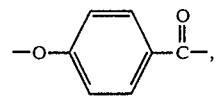

III is a dioxy aryl moiety of the formula $-\!\!\{\!O\!-\!Ar\!-\!O\!\}\!-$ wherein Ar is a divalent radical comprising at least one aromatic ring, and IV is a dicarboxy aryl moiety of the formula

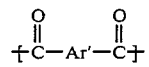

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

8. The method of claim 7 wherein said polyester comprises approximately 20 to 30 mole percent of moiety I, approximately 25 to 40 mole percent of moiety II, approximately 15 to 25 mole percent of moiety III and approximately 15 to 25 mole percent of moiety IV.

9. The method of claim 1 wherein said polymer comprises a melt processable polyester-amide which is capable of forming an anisotropic melt phase and consists essentially of the recurring moieties I, II, III and optionally IV wherein:

I is

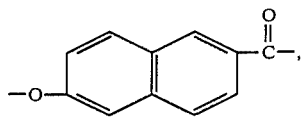

II is

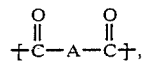

where A is a divalent radical comprising at least one aromatic ring or a divalent transcyclohexane radical;

III is $+Y-Ar-Z+$, where Ar is a divalent radical comprising at least one aromatic ring, Y is O, NH, or NR, and Z is NH or NR, where R is an alkyl group of 1 to 6 carbon atoms or an aryl group; and IV is $+O-Ar'-O+$, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III and approximately 0 to 40 mole percent of moiety IV and wherein at least some of the hydrogen atoms present upon the ring optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

10. The method of claim 1 wherein said dynamic viscosity-frequency curve has a negative slope of less than about 0.15.

11. The method of claim 1 wherein said reinforcing fibers are selected from the group consisting of glass fibers, carbon fibers, synthetic polymeric fibers, aluminum fibers, titanium fibers, steel fibers, tungsten fibers and ceramic fibers.

12. The method of claim 1 wherein said fibers comprise carbon fibers.

13. The method of claim 1 wherein said polymer further comprises a filler material.

14. The method of claim 1 wherein said polymer exhibits an inherent viscosity of from about 2.5 to about 4.5 dl./g.

15. The product produced according to the method of claim 1.

16. The product of claim 15 which is in the form of a reinforced tape.